June 23, 1936.   A. STANELLE   2,045,376
WEED ERADICATOR
Filed Dec. 26, 1934
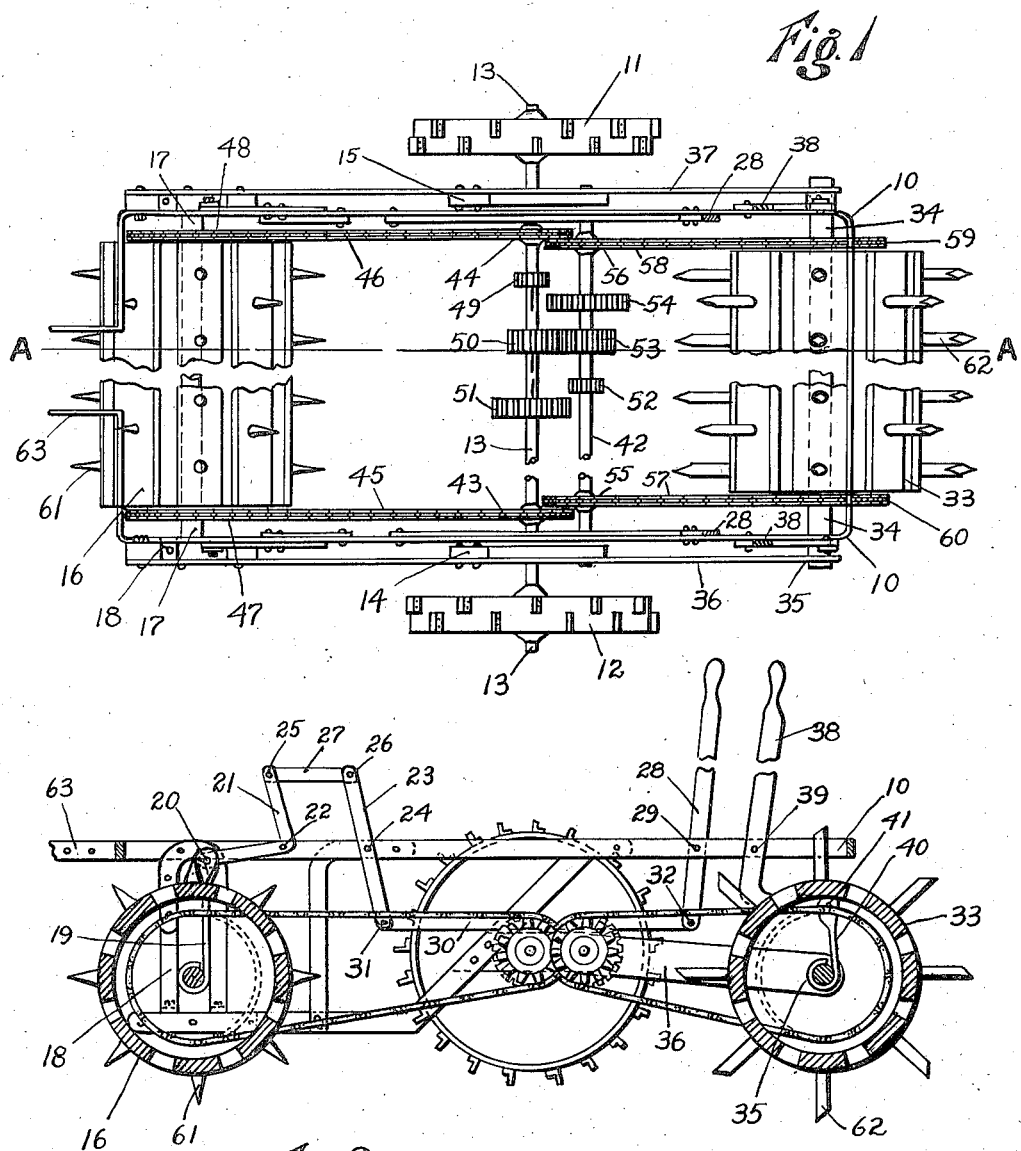
INVENTOR
Arthur Stanelle
BY John L. Bange
ATTORNEY Patented June 23, 1936

2,045,376

UNITED STATES PATENT OFFICE 2,045,376

WEED ERADICATOR

Arthur Stanelle, Forest Junction, Wis.

Application December 26, 1934, Serial No. 759,287

2 Claims. (Cl. 97—40)

My invention relates to an eradicator for weeds and more particularly to an eradicator for quack grass or the like, having a root structure horizontally disposed near the surface of the soil.

An object of my invention is to provide a device that will break up the surface of the soil and lift the weeds or grass root out of the soil.

Another object of my invention is to free the roots from any soil that may have a tendency to adhere thereto.

Still another object of my invention is to provide an eradicator that is adjustable so that the soil may be worked to any desired depth.

A further object of my invention is to provide an eradicator that is mounted on free wheels for transporting to any desired location.

With the above and other objects in view, the invention consists of certain novel details of construction and combination of parts hereinafter more fully described and claimed, it being understood that various modifications may be resorted to within the scope of the appended claims without departing from the spirit or sacrificing any of the advantages of the invention.

In the accompanying drawing which forms a part of the specification

Fig. 1 shows a top plan view of the eradicator, and

Fig. 2 shows a cross sectional view at the line AA in Fig. 1.

Referring to the drawing in which like characters of reference denote corresponding parts, it may be seen that the unit consists of a rectangular frame 10, supported by cleated wheels 11 and 12, revolving freely on an axle 13, mounted to the frame 10, by bearings 14 and 15. There is a drive drum 16, operating on a shaft 17, supported by vertically aligned bearings 18, and adjustably mounted in bearing arms 19 hinged at 20 to adjustment arms 21, which in turn are hinged to the frame 10 at 22. Rocker arms 23 pivotally fastened to the frame 10 at 24, are linked to the adjustment arms 21 by means of links 27 fastened at 25 and 26. The rocker arms 23 are further connected to the hand levers 28 which are pivotally mounted to the frame 10 at 29, by the links 30 fastened at 31 and 32.

A driven drum 33, operated on a shaft 34 supported by bearings 35 in hinged supports 36 and 37, is fastened to an auxiliary shaft 42. The shaft 34 supporting the driven drum 33, is brought to any desired height by hand levers 38 pivotally mounted on the frame 10 at 39 and linked to the shaft 34 by bearing levers 40, fastened to levers 38 at 41. The shaft 13 is supplied with rigidly mounted sprockets 43 and 44 actuated by chains 45 and 46 running over sprockets 47 and 48 on the drive shaft 16. There are slidable mounted gears 49, 50 and 51 on the shaft 13, which are arranged to engage with the permanently mounted gears 52, 53 and 54, on the auxiliary shaft 42, actuating the permanently mounted sprockets 55 and 56, having the chains 57 and 58, engaging them and passing over the sprockets 59 and 60 on the driven drum 33.

The drive drum 16 is supplied with pointed prongs 61, mounted in staggered relation to one another. The driven drum 33 is supplied with blades 62, also mounted in staggered relation to one another. The rectangular frame 10 is supplied with attaching means shown at 63, to engage a tractor hitch or pole if the device is to be drawn by horses.

In operation the entire device can be moved to location on the free rotating wheels 11 and 12, and when brought to location the hand levers 28 and 38 will permit dropping the drums 16 and 33, respectively, to the desired depth.

The pointed prongs in the drum 16 entering the soil, will cause the drum 16 to rotate in a counter clockwise direction as shown in Figure 2 when drawn by either horses or tractor. The rotation of drum 16, will cause the sprockets 47 and 48 to rotate in a counter clock-wise direction, causing a pull on the chains 45 and 46, and rotating sprockets 43 and 44, on shaft 13. By engaging the various slidably mounted gears 49, 50 and 51, on the shaft 13, with the permanently mounted gears 52, 53 and 54, on the shaft 42, the sprockets 55 and 56 will rotate in a clock-wise direction and by means of the chains 57 and 58, over the permanently mounted sprockets 59 and 60, will rotate the drum 33, in a clock-wise direction. The various sizes of gears on the shafts 13 and 42 will determine the speed of the drum 33. For example: If gears 50 and 53 are engaged as shown in Figure 1, both drums 16 and 33 will operate at the same speed, but in opposite directions. If gears 49 and 54 are engaged, the driven drum 33 will rotate very much slower in proportion to the gear ratio, than the drive drum 16. Whereas, if gears 51 and 52 are engaged, the driven drum 33 will rotate considerably faster than the drive drum 16, but always in opposite relation to one another. The hand levers 28 and 38 may be supplied with a quadrant device to hold them in a fixed position, or the rollers 16 and 33 may be left to rest on the soil, thus finding their own depth.

Having thus described my invention what I claim and desire to secure by Letters Patent in the United States, is:

1. A device of the character described comprising a frame equipped with an axle shaft having wheels mounted thereon to support the unit, an auxiliary shaft, two adjustably mounted drums equipped with prongs and supported by the frame revolving in opposite relation to each other when actuated by sprockets from the axle shaft and auxiliary shaft and multiple gears of variable dimension engaging one another mounted on the shafts to operate the drums at pre-determined speeds.

2. A device of the character described comprising a frame supported by a horizontally disposed axle having wheels mounted on its ends, said wheels operating freely and independently for conveying the unit, a driving drum equipped with prongs and journaled to movable bearings on said frame for vertical adjustment, sprockets mounted on said driving drum engaging sprockets on said axle by means of drive chains, multiple gears of various diameter slidably mounted to said axle adapted to engage permanently mounted gears of various diameter on an auxiliary shaft supported by said frame, said auxiliary shaft equipped with sprockets, a driven drum equipped with prongs adjustably mounted to said frame, said driven drum equipped with sprockets, and driving chains engaging the sprockets on said auxiliary shaft actuating the sprockets on said driven drum, causing same to rotate in opposite relation to the drive drum.

ARTHUR STANELLE.